T. HAWKINS.
Bee Hive.
No. 56,219. Patented July 10, 1866.
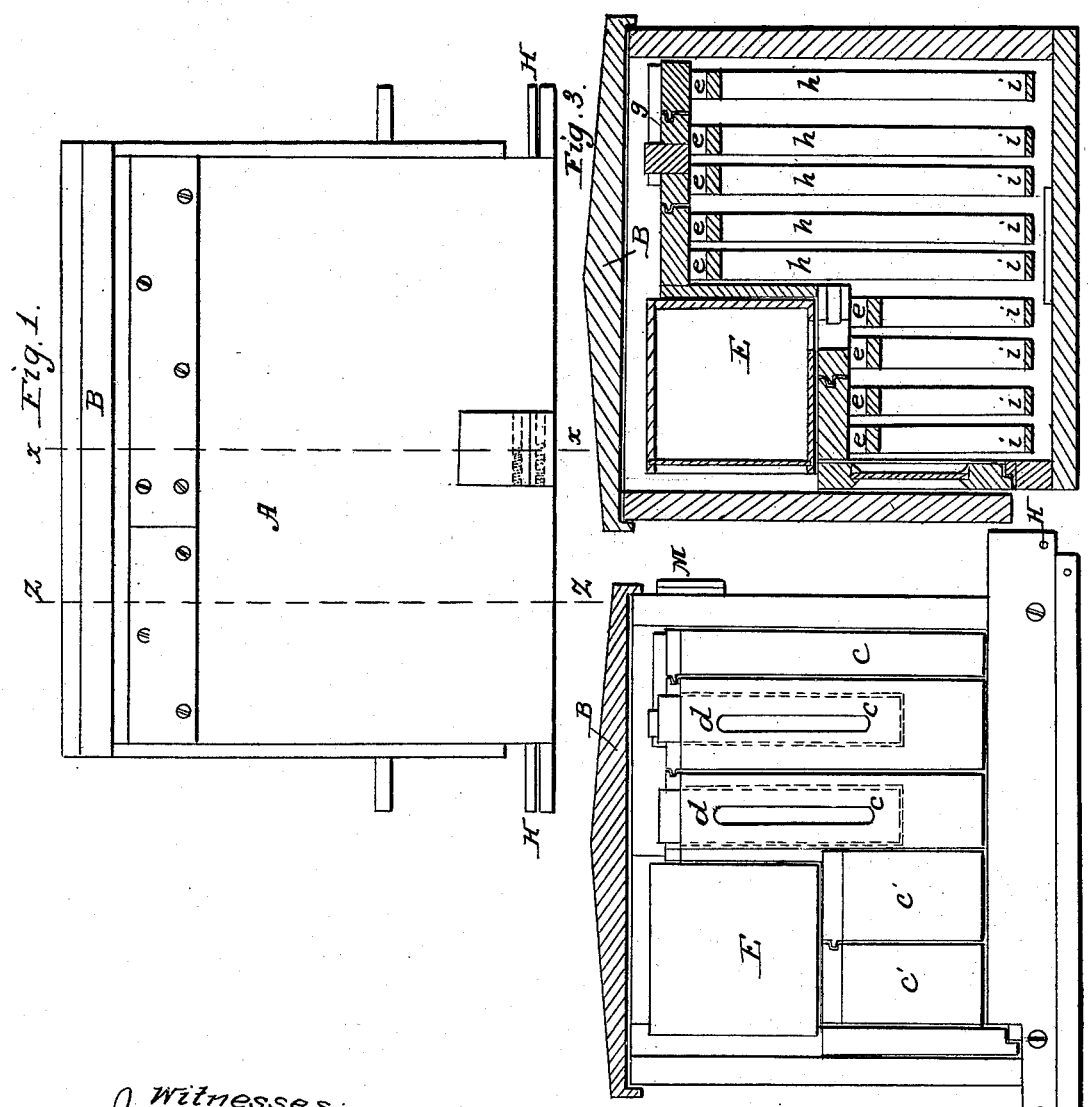

UNITED STATES PATENT OFFICE.

THOMAS HAWKINS, OF AUBURN, NEW YORK.

IMPROVEMENT IN BEE-HIVES.

Specification forming part of Letters Patent No. 56,219, dated July 10, 1866.

*To all whom it may concern:*

Be it known that I, THOMAS HAWKINS, of the city of Auburn, in the State of New York, have invented certain new and useful Improvements in Bee-Hives; and I hereby declare that the following is a true, full, and exact description of the same, reference being had to the accompanying drawings, and to the letters of reference marked thereon.

Figure 1 in the annexed drawings represents a front elevation. Fig. 2 is a vertical section of one division of the hive in the line $x\ x$. Fig. 3 is a vertical section of the same in the line $z\ z$.

The body of the hive, Fig. 1, is designated by the letter A. B represents the top of A, and has slats nailed near its edge and on its under surface, by the use of which it fits snugly on A and can be easily removed. The casing of A is furnished with bee-chambers C and C', which are placed in a vertical position and extend from the base of A to near its top, with the exception of two (marked C') in each division, which extend to half the height of A. (See Fig. 2.) Two of the chambers C have longitudinal openings in them for the admission of the bees. These openings can be closed by the metal slides $d$, (seen in dotted lines.)

The chambers C and C' are furnished with slats $h$, which enter a groove cut in the under surface of the top of said chambers and strengthened near their top by cross-bar $e$ and at bottom by the bar $i$. The slats are separated from each other at any distance required, to afford the bees a convenient surface for attaching their combs.

It will be observed that the chambers C are without any walls of separation between them, the glass pane which is inserted in the inner chamber enabling any one to inspect the bees within.

On the top of the chamber C' is placed the adjustable box or chamber E, which has a pane of glass on its outer side. This box is removed when it is desired to inspect the operation of the bees in chamber C. The box E has a hole at bottom corresponding with a similar hole in the chamber C', affording a free passage to the bees from one chamber to another.

In order to make the chambers C fit closely together and keep them firmly in position, each is furnished with a tongue, extending the whole length of the chamber, which fits in a groove in the chamber next to it. By this device the chambers are easily removed and replaced.

To secure proper ventilation in the hive one of the chambers C has a hole of suitable size in its top, which can be covered with the latch $g$, the latch having a perforation with a wire grating over it to admit the air.

It will be remarked that the two divisions of my hive are constructed precisely alike, and are connected so as to form a single hive by screwing together at bottom the projecting ends of base H, and at top by screws through the end of tie M, this tie being fastened to one division of the hive and lapping over the other. Each division of the hive is furnished with a door, which folds together when the divisions are united.

Having thus described my invention, what I claim, and desire to secure by Letters Patent, is—

The arrangement of chambers C, box E, chambers C', the base H, and the tie M, the whole constructed in the manner and for the purpose herein specified.

In testimony that I claim the above as my own I hereunto affix my signature in the presence of two witnesses.

THOMAS HAWKINS.

Witnesses:
CURTIS C. MORGAN,
JABEZ E. HAWKINS.